July 9, 1968 W. C. DEE 3,391,902
AIR BEARINGS FOR THE TURBINES OF DENTAL DRILLS AND THE LIKE
Filed June 28, 1966 3 Sheets-Sheet 1

_# 3,391,902
AIR BEARINGS FOR THE TURBINES OF DENTAL DRILLS AND THE LIKE
William C. Dee, 2 Frederica Road, Talbot Woods,
Winton, Bournemouth, England
Filed June 28, 1966, Ser. No. 561,228
Claims priority, application Great Britain, June 29, 1965,
27,587/65
3 Claims. (Cl. 253—2)

ABSTRACT OF THE DISCLOSURE

A dental drill including an axial flow turbine driven by compressed gas, the rotor of the turbine being supported at its front and rear on hydrostatic gas bearings. The front bearing is an axial-radial thrust bearing while the rear bearing is of frusto-conical shape which conforms to the frusto-conical shape of the rear portion of the rotor, which arrangement provides increased axial load carrying capacity.

---

This invention relates to gas bearings intended more particularly, although not exclusively, for dental turbines, and has for its primary object the provision of a high speed turbine operating on gas bearings designed so as to give maximum support for the rotor both radially and axially whilst making provision for absorption of unwanted vibration of the self-excited kind due to out-of-balance forces.

It is already known to support a rotor of a dental turbine in a pair of journal gas bearings, resiliently mounted so as to absorb out-of-balance loads which result in instabilities at certain predetermined speeds. However, the load carrying capacity is limited due to (a) the essential requirement of limiting the overall size of the turbine to enable its operation in confined spaces and (b) the requirement of utilizing the radial faces of the rotor as thrust bearings.

A requirement of such a high speed turbine for dentistry is the necessity of having as great a unit area as possible to enhance load-carrying capacity of the journal bearings, thus adversely affecting the load carrying capacity of the thrust bearings by reducing their unit area.

Since the applied loads on such a turbine, when in use, are mainly radial and uni-axial, then a design such as to absorb such loads giving increased load carrying capacity will result in increased efficiency.

It is well known that the resilient mounting of gas bearing shells within some form of resilient mount such as O-rings of low shore hardness assists to overcome both instabilities within the speed range and in self alignment of the bearing shells for both hydrostatic and hydrodynamic gas bearings, and that this approach has been consistently utilized where a pair of gas journal bearings have been incorporated in some rotating component.

The object of the present invention is to provide improved gas bearings for high speed rotating components and in the particular application referred to, to increase axial load carrying capacity.

Broadly, according to the present invention, there is provided a dental drill or the like wherein a compressed gas-driven turbine is supported on hydrostatic bearings of the gas type and wherein one is of the axial/radial type whilst the other is a conical or frusto-conical air bearing.

Both bearings may follow the design as per G. L. Shires having standard orifice jets. The journal bearing is therefore designed on conventional lines as laid down by Shires whereas the conical bearing is designed and calculated on a basis of Shires' formula for a "circular thrust bearing."

The formula given by Shires, there of $$W = Kg(P_0 - P_a) \frac{(b-a)^2}{\log (b/a)}$$

may be used to determine the effect of the cone angle on the axial load capacity, where:

$W$ = Load capacity
$Kg$ = Bearing pressure ratio
$P_0$ = Supply pressure
$P_a$ = Ambient pressure
$b$ = Outer radii
$a$ = Inner radii Using this formula the radii $b$ and $a$ are measured as indicated in FIGURES 3 and 4 of the accompanying drawings.

Variation of the angle will vary the axial and radial components of the bearing, the former increasing with decreasing angle, the latter increasing with increasing angle.

Since it is known that the front bearing is subject to greater radial loads than the rear bearing and that the rear bearing is mainly subject to applied axial loads, the front bearing is designed to have a greater length to diameter ratio than the rear.

Although air bearings have previously been successfully applied to dental turbines their load carrying capacity has been limited due to their small size and both front and rear bearings have been of the journal type utilising the rotor faces as the thrust bearings. This disadvantage is overcome by the arrangement incorporating a conical bearing as provided by the present invention.

A further disadvantage experienced with known types of dental turbines incorporating air bearings is that due to the inherent characteristics of the problem of "whirl" when necessity for mounting them in some form of resilient mounting has restricted the diameter of the shaft thus tending to lower unit area characteristics. The arrangement of the bearing design provided by this invention enables an increased load carrying capacity to be obtained by the increase of shaft diameter whilst still remaining within an acceptable overall diameter of the turbine head.

To date the conventionally accepted method of driving the turbine has been by means of a single jet tangentially disposed within the housing and impinging upon turbine blades of the Pelton wheel design machined within the outer periphery of the rotor and applying a unidirectional radial load.

Such a design, however, has certain drawbacks. Firstly, the driving media is forced to travel through approximately 270° before being able to exhaust away from the turbine housing; during this period it is forced to conform to a considerable change of direction where its speed is rapidly being retarded due to fluid friction enhanced by the centrifugal action of the rotor. Since effective work done occurs only at the orifice exit for the remaining distance of travel to the exhaust port the media is applying a braking force to the turbine periphery, and in order to attempt to reduce the retardation effect some form of expansion chamber must be incorporated.

Secondly, due to the extremely small size of the rotor it is not possible to machine correctly formed bucket shapes within its periphery again resulting in certain loss of power.

With the present design of axial flow turbine however, these problems are greatly reduced whilst at the same time a balanced driving load is applied to the turbine.

A further advantage with this design also is that it eliminates the problem of having to accurately position the rotor cheeks between the bearing and faces in order to ensure axial load carrying capacity, and automatically provides an expansion chamber for the driving media to exhaust to atmosphere.

The position of the driving jets in relation to the turbine blading can be optionally angled within the bearing end face.

It will be appreciated that the outline design of rotor can of course be easily adapted to the present known arrangement of air bearing dental turbines using the already well known principle of mounting the bearing shells within some form of resilient mounting.

A further point for consideration is that with the termination of the supporting and driving gas to the bearings and turbine, the rotor will continue to rotate for a certain period under hydrodynamic conditions, as opposed to normal hydrostatic conditions. However, a period is reached when hydrodynamic lift fails and contact occurs, at still a relatively high speed, between shaft and bearing shell.

Compatibility of materials is therefore of vital importance since high temperature gradients can occur at the moment of touch down. For this reason it is proposed that the bearing shells be manufactured in some form of ceramic material, preferably silicone nitride, which greatly reduces any possible adverse effects resulting in longer life factors. Assembly of the bearing components may be effected by the use of Eastman/Kodak cement where the bearing shells conform to the design of patent application No. 25,840/65, but would not be required where bearing shells were used utilising the well known jet orifice design.

To enable the invention to be clearly understood, preferred embodiments thereof will now be described by way of example with reference to the accompanying drawings, wherein.

Figure 1:
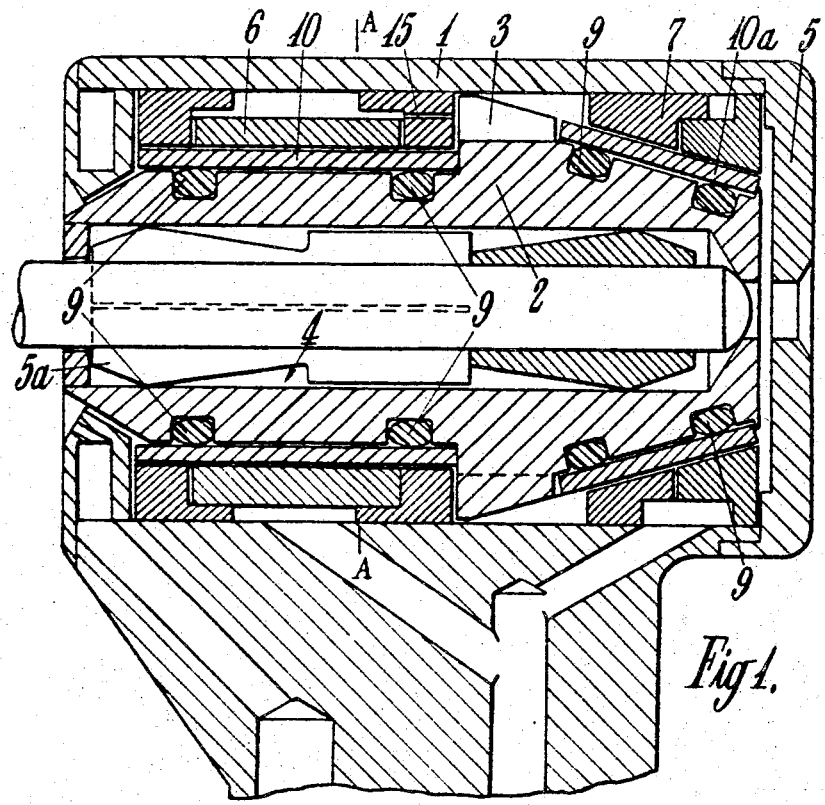
FIGURE 1 is a longitudinal section illustrating one embodiment.
Figure 3:
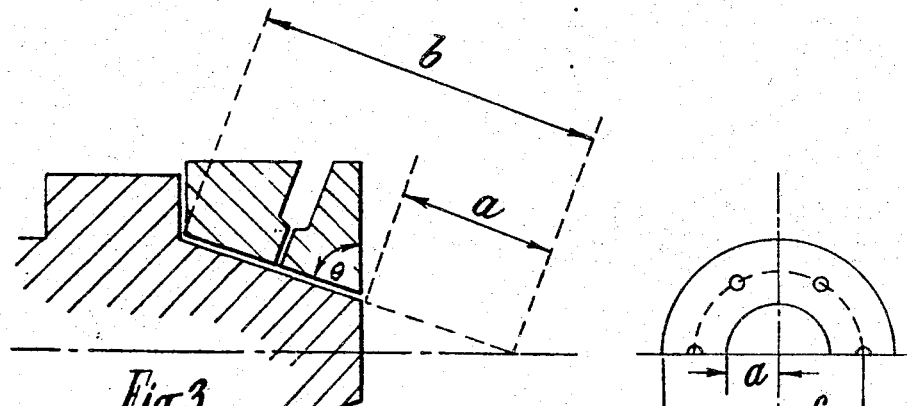
FIGURES 3 and 4 are diagrams illustrating the factors to be considered in working out a formula for design of the conical bearing.
Figure 4:
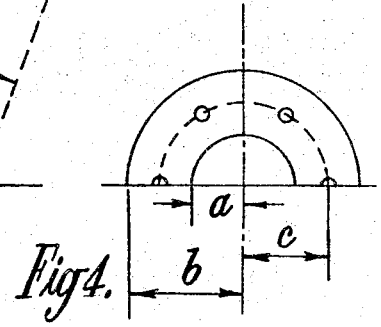

Referring firstly to FIGURE 1, the turbine housing is indicated at 1, the turbine at 2 and the turbine blading at 3. The turbine is formed with a bore 4 for the reception of a dental drill or cutter and means are provided for retaining the drill securely in position. Such means preferably, but not essentially, comprise a magnetic coil housing in an end cap 5 or a self locking clutch 5a.

The turbine 2 rotates at its front and in a front hydrostatic air bearing 6 and the rear part of the turbine rotates in a conical or frusto-conical hydrostatic air bearing 7 which constitutes a thrust bearing.

The front bearing 6 is designed on conventional lines as indicated by Shires' formula whereas the rear bearing 7 is designed and calculated as "a circular thrust bearing with a ring of jets," as hereinbefore explained.

Figure 5:
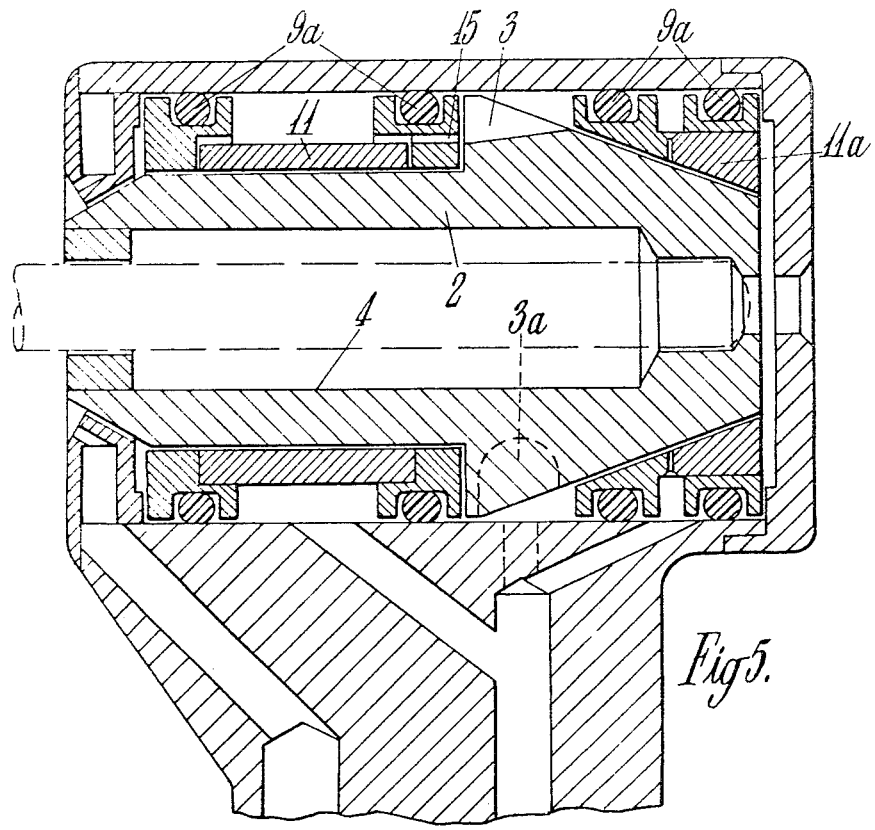
FIGURE 5 is a view similar to FIGURE 1 illustrating a conventional embodiment of resilient mounting bearing shells and the present known method of Pelton wheel drive by single tangential jet, shown in dotted perspective.

The resilient mountings proposed by this invention are indicated at 9 on the drawings and can either be interposed between the rotor 2 and shells 10 and 10a as shown in FIGURE 1, or alternatively, as indicated at 9a in FIGURE 5 between the inner face of the turbine housing 1 and bearing shells 11 and 11a.

The front hydrostatic bearing 6 shown in FIGURE 5 may be mounted in a support structure by a resiliently compressible medium such as O-rings having a predetermined shore hardness as set forth in British Patent No. 1,018,300.

Figure 2:
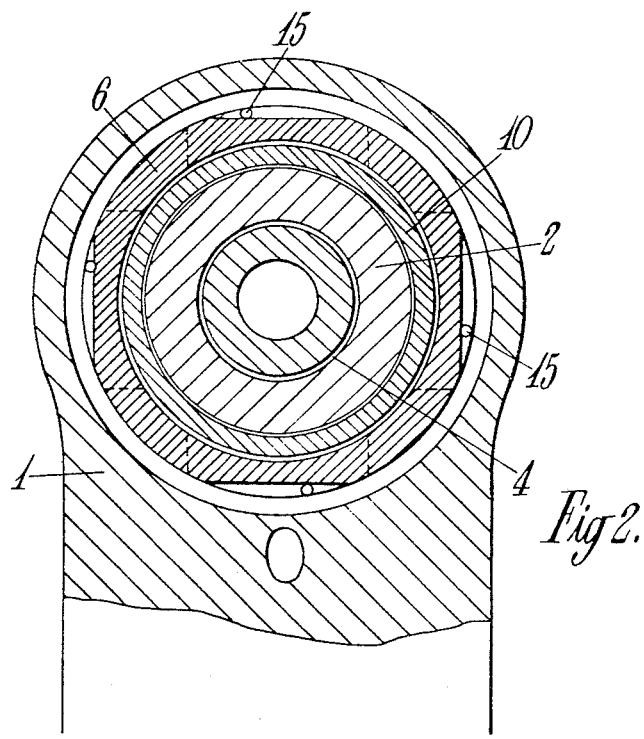
FIGURE 2 is a fragmentary section taken on a line A—A of FIGURE 1.
Figure 2A:
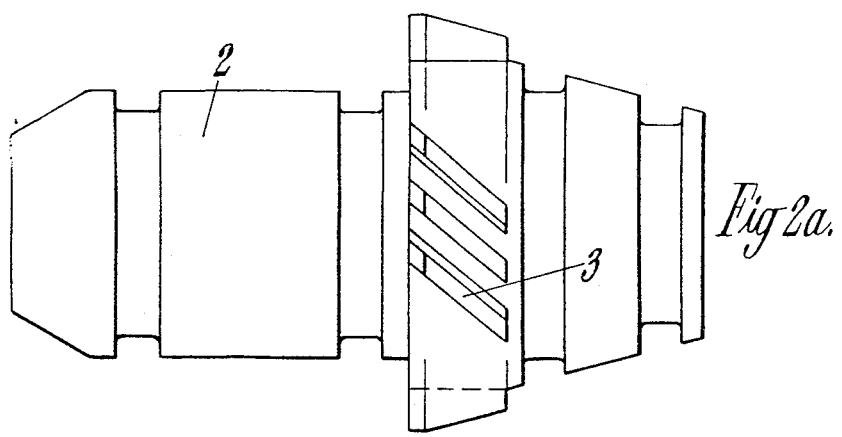
FIGURE 2A is a view of the rotor in elevation.

The method of driving the rotor 2 can either be achieved in the conventional manner, i.e. by arranging for an air jet to impinge on to the periphery of a rotor in which pockets 3a are formed as shown in FIGURE 5 or by an axial flow method in which blades 3 are machined in the periphery of the rotor as shown in FIGURES 1 and 2A which are impinged against by a series of axially directed air jets 15 positioned around the bearing shell end face.

Figure 6:
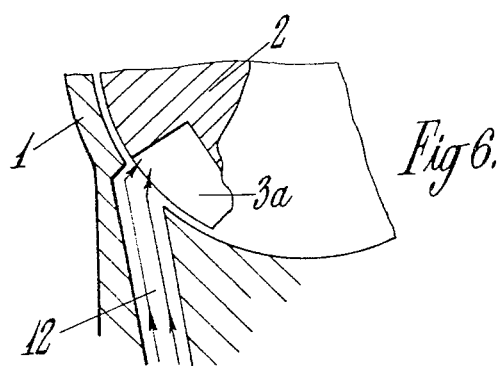
FIGURE 6 is a detail view illustrating the positioning of a single tangential air jet for impinging against pockets in the rotor.

With the conventional turbine driving method in which air jets are caused to impinge against the pockets 3a the jet orifice must be machined directly in the rotor housing and when the rotor is revolving at its maximum speed (approximately 600,000 r.p.m.) a certain loss of driving power results. This is due to the centrifugal forces created by the rotor which tends to centrifuge the air away from its path from the jet, to around the wall of the rotor chamber. In order to decrease this loss of driving power, at speed, by slightly repositioning of the air jet, the air flow is formed inwards to impinge into the pockets 3 at the exit of the air jet where the air flow is at its maximum speed thus giving increased driving force at speed. The proposed positioning of the air jet according to this invention is indicated at 12 in FIGURE 6.

As previously explained, a further point for consideration is that when the air supply to the turbine and the air bearings is cut off, although the rotor will continue to rotate for a certain period under hydrodynamic conditions, as opposed to normal hydrostatic conditions, there comes a time, whilst the drill is still travelling at a high surface speed, when insufficient hydrodynamic lift is created and at this point the rotor comes into contact with the bearing shell.

Due to this occurrence, compatibility of materials, i.e. that of the shaft and the bearing shell are very important in order to prevent galling or pick up between the rotor and the shell because at this moment of touch, extreme temperature gradients can result. For this reason it is proposed to make the bearing shells 11 and 11a (FIGURE 5) and the shells 6 and 7 (FIGURE 1) of ceramic or silicon nitride which overcomes the foregoing drawback and results in a longer life for the turbine.

The use of an axial/thrust hydrostatic air bearing 6 in the front part of the turbine in conjunction with a conical hydrostatic air bearing 7 at the rear part of the turbine permits a greater length to diameter for the forward air bearing 6 and therefore a greater load carrying capacity. At the same time the use of the conical air bearing 7 at the rear part of the turbine allows for greater axial loading when the turbine is in use.

With the arrangement of air bearings 6 and 7 according to this invention the axial load carrying capacity is increased in such a manner as to enable a further increase in the radial load carrying capacity of the front bearing 6 and at the same time results in increased turbine efficiency.

I claim:

1. A dental drill including a source of pressurized gas and comprising in combination a housing, an axial flow turbine mounted within the housing, said turbine including a rotor having a central bore and a frusto-conical rear portion, drill retaining means within said bore, a front axial thrust hydrostatic gas bearing within said casing and surrounding said rotor, a rear hydrostatic gas bearing of frusto-conical shape also within said casing and surrounding the frusto-conical rear portion of said rotor, and a plurality of gas jets in said housing through which gas under pressure is supplied to said rotor and said front and rear bearings to provide maximum support for said rotor both radially and axially while said drill is in use.

2. A dental drill according to claim 1, wherein said front bearing has a greater length to diameter ratio than the rear bearing.

3. A dental drill according to claim 1, wherein each of said bearings includes shells made of silicon nitride.

References Cited

UNITED STATES PATENTS

| | | | |
|---|---|---|---|
| 3,175,293 | 3/1965 | Borden | 253—2 |
| 3,255,527 | 6/1966 | Staunt | 253—2 |
| 2,442,202 | 5/1948 | Hughes-Caley | 253—3 |
| 2,643,852 | 6/1953 | Holzwarth | 253—77 |
| 3,088,707 | 5/1963 | Williams et al. | 253—2 |
| 3,128,988 | 4/1964 | Mandroian | 253—2 |
| 3,210,044 | 10/1965 | Mori | 253—2 |
| 3,268,205 | 8/1966 | Allen et al. | 253—2 |

FOREIGN PATENTS 956,526   4/1964   Great Britain.

EVERETTE A. POWELL, JR. *Primary Examiner.*